United States Patent
Ernst et al.

(10) Patent No.: US 8,408,856 B2
(45) Date of Patent: Apr. 2, 2013

(54) SELF-DRILLING FASTENER

(75) Inventors: Richard J. Ernst, San Diego, CA (US);
Mark E. Gonciarz, South Elgin, CA (US); Donald J. Broomfield, Elgin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 384 days.

(21) Appl. No.: 12/913,503

(22) Filed: Oct. 27, 2010

(65) Prior Publication Data

US 2011/0103917 A1 May 5, 2011

Related U.S. Application Data

(60) Provisional application No. 61/257,355, filed on Nov. 2, 2009.

(51) Int. Cl.
*F16B 25/10* (2006.01)

(52) U.S. Cl. ............... 411/387.1; 411/371.2; 411/387.2; 411/387.8; 411/402

(58) Field of Classification Search ............... 411/371.2, 411/387.1, 387.2, 387.6, 387.8, 402, 403, 411/404
See application file for complete search history.

(56) References Cited

U.S. PATENT DOCUMENTS

| | | | |
|---|---|---|---|
| 3,463,045 A | | 8/1969 | Prescott |
| 3,739,682 A | * | 6/1973 | Siebol et al. ............... 411/387.2 |
| 3,882,756 A | * | 5/1975 | Sauer et al. ............... 411/387.1 |
| 4,708,557 A | * | 11/1987 | Hashimoto ............... 411/387.8 |
| RE33,901 E | * | 4/1992 | Shinjo ............... 411/387.1 |
| 5,141,376 A | | 8/1992 | Williams |
| 5,499,896 A | * | 3/1996 | Cafarelli ............... 411/387.2 |
| 5,697,746 A | * | 12/1997 | Brown et al. ............... 411/396 |

(Continued)

FOREIGN PATENT DOCUMENTS

| | | |
|---|---|---|
| EP | 1 331 408 A1 | 7/2003 |
| FR | 2 491 563 A3 | 4/1982 |

OTHER PUBLICATIONS

International Searching Authority (ISA/EP) PCT International Search Report for International Application PCT/US2010/054985; Mailing Date Jan. 26, 2011; 4 pages.

*Primary Examiner* — Roberta Delisle

(74) *Attorney, Agent, or Firm* — Mark W. Croll; Patricia Chidiac; Beem Patent Law Firm

(57) ABSTRACT

A fastener mountable to a rigid substrate such as a fiber cement panel and also mountable to the panel and an underlying support, such as a metal or wooden stud. The fastener may include a drilling portion having a reaming portion for reaming out the material within the panel, a fastening portion for engaging the panel and, if encountered, the underlying support, and a tapered portion between the drilling and fastening portions. The drilling portion may have a length generally equal to, or slightly longer than, a length of the panel so that reaming out of the panel may be completed before engagement of the fastener threads with the interior of the panel begins.

20 Claims, 2 Drawing Sheets

U.S. PATENT DOCUMENTS

| | | | | |
|---|---|---|---|---|
| D418,048 S | * | 12/1999 | Chan | D8/387 |
| 6,142,719 A | * | 11/2000 | Daubinger et al. | 411/387.8 |
| 6,185,896 B1 | * | 2/2001 | Roberts et al. | 52/537 |
| 2002/0090278 A1 | * | 7/2002 | Lai | 411/387.8 |
| 2002/0168245 A1 | * | 11/2002 | Kuo-Tai | 411/387.1 |
| 2003/0147717 A1 | * | 8/2003 | Koppel et al. | 411/387.1 |
| 2004/0018069 A1 | * | 1/2004 | Lai | 411/387.1 |
| 2006/0291978 A1 | * | 12/2006 | Panasik et al. | 411/378 |
| 2008/0260495 A1 | * | 10/2008 | Gong et al. | 411/386 |
| 2011/0103917 A1 | * | 5/2011 | Ernst et al. | 411/387.2 |

* cited by examiner

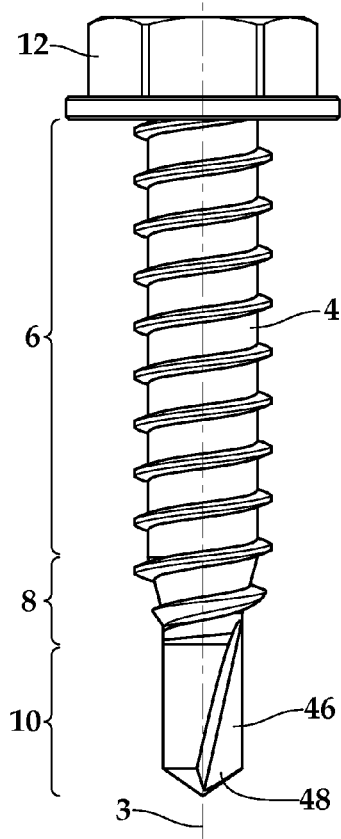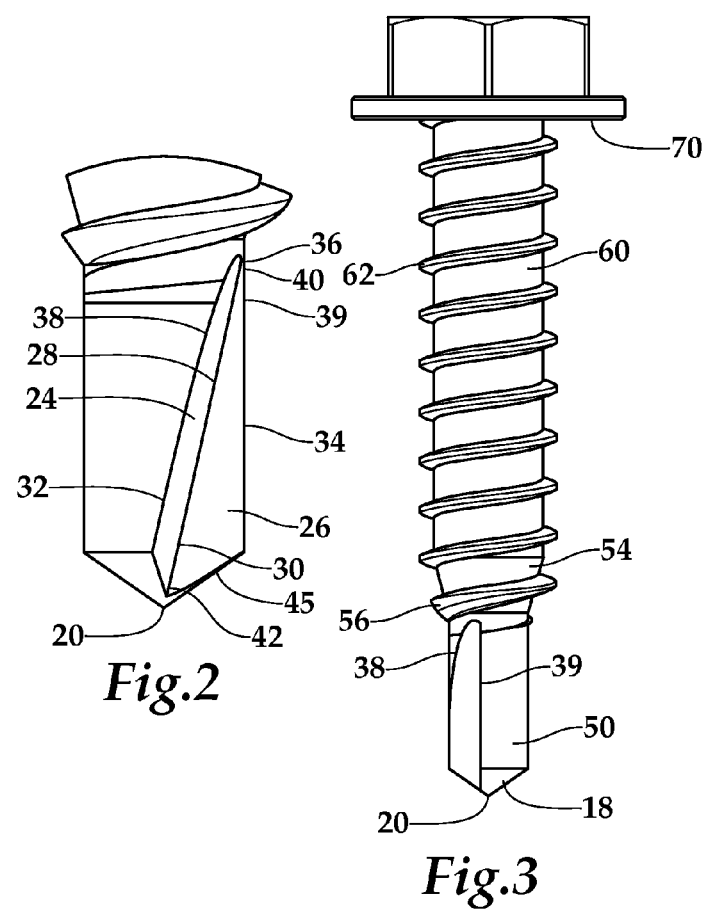
Fig.1
Fig.2
Fig.3
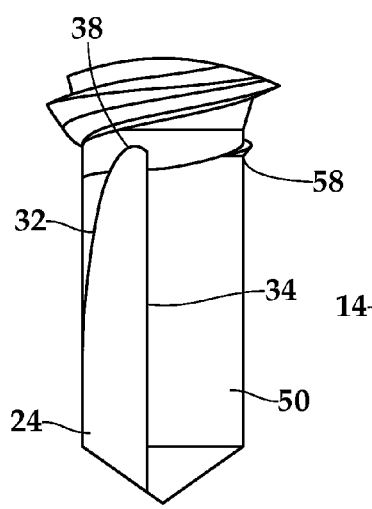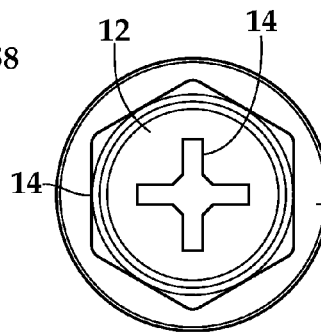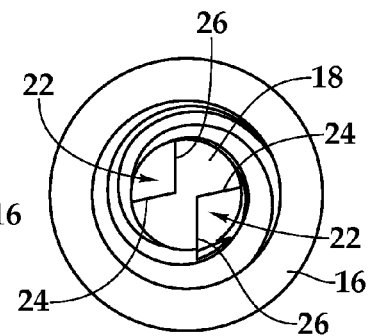
Fig.4
Fig.5
Fig.6

SELF-DRILLING FASTENER

This application claims the benefit of priority from U.S. provisional application 61/257,355, filed Nov. 2, 2009.

BACKGROUND OF THE INVENTION

1. Field of the Invention

The present invention is directed to a fastener mountable in a fiber cement substrate, including, e.g., a fiber cement substrate mounted to a support such as a steel or wooden stud.

2. Description of the Related Art

Fiber cement substrates such as hardiboard may be cladding made of cellulose fibers mixed with cement. This cladding is touted as a durable, effective alternative to traditional wood or aluminum siding, trim, soffits, weather barrier and backerboard. Due to its dense structure, this substrate may be resistant to termites and pests and may be expected to last for decades with little or no maintenance. Examples of Hardiboard include products manufactured by James Hardie International, e.g., HARDIEPLANK and HARDIEPANEL.

While aiding in durability, the density of fiber cement panels limits the types of fasteners that may be used to mount objects to the panels, or it may impose additional installation steps. For example, nails typically are impact driven into the panels to penetrate the panels quickly and fasten them to underlying supports. Mounting objects may require the use of similar nails, or it may require the user to drill a pilot hole in order to use other types of fasteners.

If traditional drywall fasteners are used, the internal material may be driven out of the hole, toward the fastener head, causing a furl or lump to be raised on the face of the panel, which may inhibit the fastener head or the object to be mounted from seating flush with the panel, and it may worsen engagement of the fastener with the panel and/or support. To minimize this furl, a separate pre-drilling step of providing a pilot hole may be necessary, requiring the installer to have additional tools and leading to increased planning and installation time.

Due to the density of the panel, traditional stud finders may be ineffective at locating underlying supports, be they wooden or steel studs, or other supports. In addition, these fasteners may be ineffective at penetrating and engaging an underlying stud unless a pilot hole is created. In this event, the user either requires additional installation steps or runs the risk of hitting and not being able to engage the support. In the latter case, the fastener may push against the surface of the support without penetrating it, which may push the panel away from the support and worsen the connection between the panel and the support, or it may cause the fastener to spin in place when the tip contacts the support, causing the fastener threads to strip out the hole. In addition, the user may have to back the fastener out and drive it in a different location, leaving an unsightly hole in the panel.

What is needed is a holder mountable to a fiber cement or similar substrate in a variety of locations that may be easily installed for increased pullout resistance and load capacity.

BRIEF SUMMARY OF THE INVENTION

In one aspect, a fastener for engaging a rigid substrate, comprising: a drilling portion having a reaming portion and a generally cylindrical fragment, the reaming portion having a leading face and a trailing face; a fastening portion having a generally constant root diameter and threading with a generally constant major diameter; a tapered portion between the drilling and fastening portions, the tapered portion having threads with a pitch generally equal to a pitch of the fastening portion threading; and a head having torque transmitting surfaces.

The fastener may include a pair of diametrically opposed reaming portions. In addition, the drilling portion may have a major diameter less than the fastening portion root diameter. The head may be hexagonal, and the fastener may include a washer between the fastening portion and the head, the washer having a diameter larger than a head diameter.

The reaming portion may include a leading face and a trailing face, each face having an inner edge and an outer edge, and the inner edges may intersect and be aligned to form a common edge. In addition, the trailing face inner edge may intersect the trailing face outer edge at a point proximate an intersection of the drilling and tapered portions. Moreover, the leading face outer edge may have a portion that is right-handed and the trailing face outer edge may have a portion that is generally parallel to a fastener axis.

In another aspect, a fastener for engaging a rigid substrate may comprise: a drilling portion having a plurality of reaming portions and a plurality of generally cylindrical fragments, wherein a generally cylindrical fragment is circumferentially spaced between a pair of the reaming portions, a fastening portion having a generally constant root diameter and threading with a generally constant major diameter; a tapered portion between the drilling and fastening portions; and a head having torque transmitting surfaces; wherein each reaming portion has a leading face and a trailing face, the leading face having an outer edge that is right-handed. The drilling portion may be unthreaded, and the plurality of generally cylindrical fragments may have a root diameter smaller than a root diameter of the fastening portion. The tapered portion may include threads with a pitch generally equal to a pitch of the fastening portion threading. Moreover, the fastener may include a washer between the fastening portion and the head, the washer having an underside generally perpendicular to an axis of the fastener and a diameter larger than a diameter of the head.

In still another aspect, a fastener for engaging a rigid substrate may comprising: a drilling portion having a plurality of reaming portions and a plurality of generally cylindrical fragments therebetween, a fastening portion having a generally constant root diameter and threading with a generally constant major diameter; a tapered portion between the drilling and fastening portions; and a head having torque transmitting surfaces, which may include both hex surfaces and a screwdriver recess. Each reaming portion may have a leading face and a trailing face, the leading face having an outer edge that is right-handed. In addition the leading face and the trailing face may have a common inner edge. The common inner edge may be right-handed, and it may intersect an outer edge of the trailing face. Moreover, the leading and trailing faces may be angled with respect to each other between about 90 degrees and about 105 degrees, preferably about 100 degrees.

These and other features and advantages are evident from the following description of the present invention, with reference to the accompanying drawings.

BRIEF DESCRIPTION OF THE SEVERAL VIEWS OF THE DRAWINGS

FIG. 1 is a side view of a fastener mountable to a durable substrate such as a fiber cement panel.

FIG. 2 is a detailed view of the drilling portion and part of the tapered portion of the fastener of FIG. 1.

FIG. 3 is a side view of the fastener of FIG. 1, rotated 90 degrees from FIG. 1.

FIG. 4 is a detailed view of the drilling portion and part of the tapered portion of the fastener of FIG. 3.

FIG. 5 is a top view of the fastener of FIG. 1.

FIG. 6 is a bottom view of the fastener of FIG. 1.

DETAILED DESCRIPTION

Figure 7:
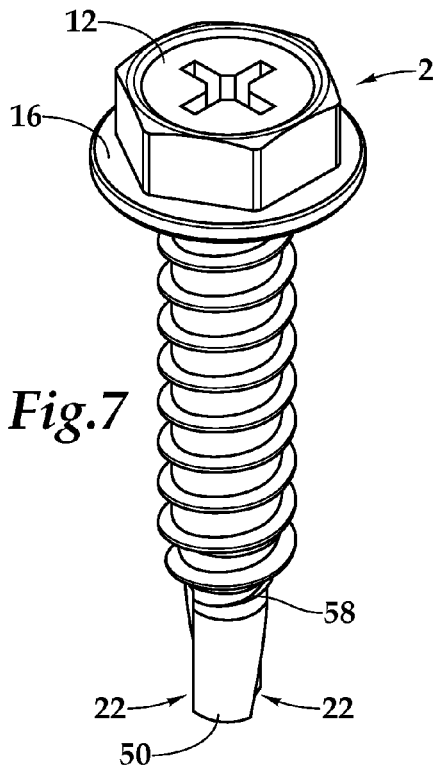
FIG. 7 is a perspective view of the fastener of FIG. 1.

As seen in FIG. 1, a fastener 2 for mounting objects to a fiber cement panel may include a shank 4 having a threaded fastening portion 6, a reduced diameter drilling portion 10 and a tapered portion 8 in between. In addition, the fastener 2 may include a head 12 having torque transmitting surfaces 14 and an integrated washer 16 between the head 12 and the fastening portion 6. Fastener 2 may be configured so that drilling tip 18 drills or reams through the panel, removing panel material. When no support is encountered, the fastener 2 may continue through the panel, with the threaded portion 6 tapping mating threads in the panel. In the event a support is encountered, the drilling portion 10 may drill through the support, allowing the fastener 2 to continue its axial movement. If the support is a wooden stud, the drilling portion 10 may engage and ream out an opening in the stud, in effect creating a pilot hole for the threaded portions 6 to engage the stud, just as it created a pilot hole for the threaded portions 6 to engage the panel. In addition, the coarse, heavy thread 62 of the fastening portion may overpower the drilling action of the drilling portion 10 and drive the fastener 2 into the stud. Steel supports, on the other hand, may be relatively thin, such that drilling is completed relatively quickly and a hole is created all the way through the stud. However, in this case, the threaded portion 6 still will engage the thin steel support to create greater positive engagement.

Drilling Portion

Figure 8:
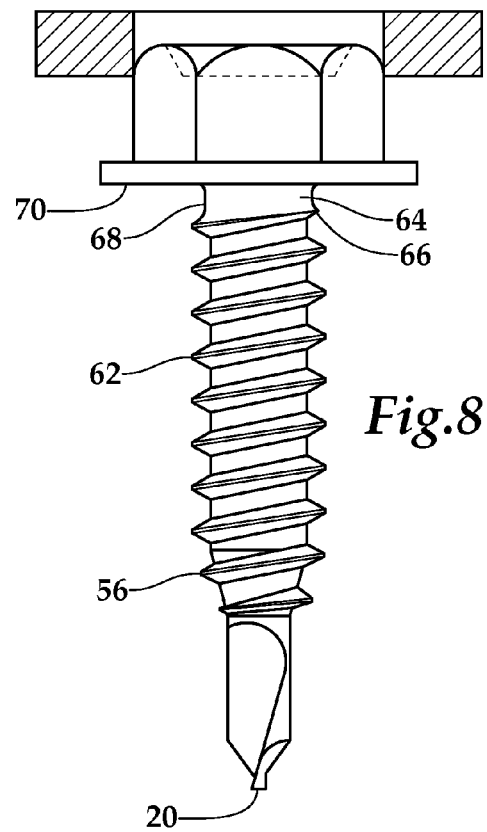
FIG. 8 is a side view of a second embodiment of a fastener mountable to a durable substrate such as a fiber cement panel.
Figure 9:
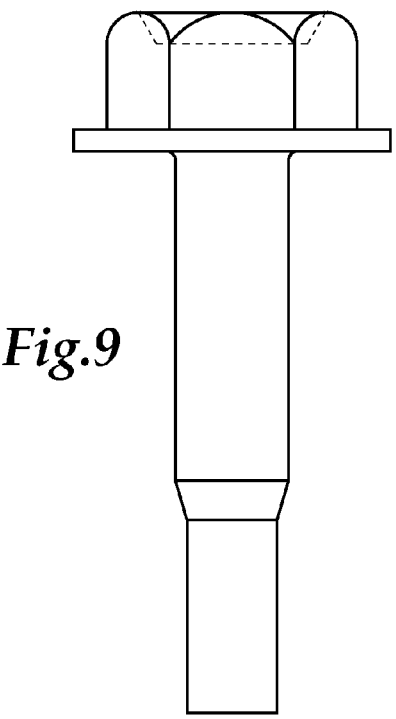
FIG. 9 is a side view of a blank from which the fastener of FIGS. 1 and 8 may be created.
Figure 10:
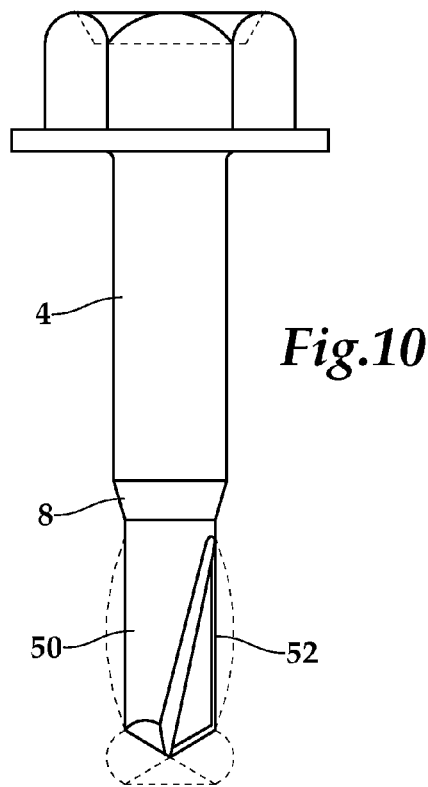
FIG. 10 is a side view of the blank of FIG. 9 after the drilling/reaming tip has been formed, but before the threads have been formed.

Turning to the detailed views of FIGS. 2 and 4 and the alternative embodiment of FIG. 8, the drilling portion 10 may converge to a sharp point 20 at a generally axially aligned position. Drilling portion 10 may be unthreaded and have a major diameter generally equal to the root diameter of threaded portion 6. Preferably, however, drilling portion major diameter is smaller than the threaded portion root diameter.

In addition, the drilling portion 10 may include a plurality of reaming portions 22 to cut away the substrate during installation. For example, as seen in FIGS. 6-7, the fastener 2 may include two generally diametrically opposed reaming portions 22, although more or fewer reaming portions are possible. Reaming portions 22 may be spaced radically inward from drilling portion diameter, and drilling portion 10 may include convex, generally cylindrical fragments 50 between reaming portions 22.

Returning to FIGS. 2 and 4, each reaming portion 22 may include a leading face 24 and a trailing face 26, each with inner edges 28, 30 and an outer edges 32, 34, whereby the inner edges 28, 30 may serve as the intersection of the leading face 24 and the trailing face 26. Upper end 36 of inner edges 28, 30 may intersect upper end 40 of outer edge 34 of trailing face 26 at a location along external circumference of drilling portion 10, and lower end 42 of inner edges 28, 30 may be generally axially aligned and intersect drilling point 20. As such, the inner edges 28, 30 may be right-handed, creating more surface area at the bottom 48 of trailing face 26 as compared to its top 46. Trailing face 26 may be a generally flat surface lying in a plane including or generally normal to axis 3, while leading face 24 may be generally flat or may be slightly convex, generally lying in a plane offset from or angled with respect to axis 3. As such, leading face 24 and trailing face 26 may be angled with respect to each other at drilling tip 18 between about 80 degrees and about 110 degrees, preferably between about 90 degrees and about 105 degrees, still more preferably about 100 degrees.

The outer edges 32 of the leading face 24 may include an upper edge 38 along outer circumference that is angled in a right-handed fashion, such that a clockwise rotation of the fastener 2 may result in progressive engagement of the upper edge 38 with the substrate. In contrast, the outer edges 34 of the trailing face 26 may include a generally axially parallel upper edge defining a major diameter of the drilling portion 10. The outer edges 32, 34 of both the trailing and leading face may include lower edges 44, 45 meeting at a drilling tip. Lower edge 44 of leading face 24 may be angled from a central axis 3 by an amount between about 20 degrees and about 65 degrees, preferably between about 20 degrees and about 40 degrees, and in one embodiment, about 30 degrees. Conversely, lower edge 45 of trailing face 26 may be angled from a central axis 3 by an amount between about 35 degrees and about 80 degrees, preferably between about 50 degrees and about 70 degrees, and in one embodiment, about 60 degrees. This angle disparity may allow leading edge to move quickly through the panel and substrate, while the increased surface area caused by the increased angle of the trailing edge may increase the surface area of the trailing face 26, resulting in greater surface area for reaming out the panel and substrate. In addition, upper and lower edges of trailing face 26 may have a slight lip 52 along their lengths, wherein the lip 52 is raised slightly from the remainder of the trailing face 26.

Drilling portion 10 may have a length adapted to drill substantially completely through the panel so that the drilling tip 18 has exited the rear side of the panel before the threads 56 begin to engage the front side. Additionally, the drilling portion 10 may be slightly longer so that the tip 18 drills through and reaches the rear side of an underlying steel support, if one is encountered, before the threads 56 begin to engage the front side of the panel. For example, for a substrate having a thickness of about 5/16", drilling portion 10 may have an axial length between about 1/8" and about 1/4", preferably between about 1/4" and about 1/4", still more preferably, about 3/8", and in one embodiment, a minimum of about 0.35". In addition, drilling portion 10 may have an outside diameter between about 1/16" and about 1/4", preferably between about 1/8" and about 3/16", and in one embodiment, about 0.15". By reaming out the panel and any underlying support generally before threads 56 engage the panel, this reduced major diameter effectively creates a pilot hole to ease engagement by the threaded portion 10. In the case where a wooden support is encountered, the drilling tip 18 may continue to ream out the support while the threaded portion 6 engages the panel. However, the heavy, coarse thread 62 may provide strong, positive engagement in the panel, driving the drill tip 18 into the support.

Drilling/reaming may proceed at a substantially slower speed than fastening, so length of drilling portion 10 may help ensure that drilling is completed before fastening occurs in panel-only and panel-plus-steel support applications. Moreover, this may allow for drilling dust to be evacuated on a rear side of the panel or a thin support. In panel-plus-wood (or other, larger supports) applications, the positive thread engagement (and its accompanying increased fastening speed) may predominate the axial motion of the fastener 2, allowing the fastener 2 to engage both the substrate and the support.

Tapered Portion

Moving away from drilling portion 10, fastener 2 may include a tapered portion 8 having a frustoconical root 54 and threading 56, as seen in FIG. 3. Root 54 may be angled between about 5 degrees and about 30 degrees with respect to axis, preferably between about 10 degrees and about 20 degrees, still more preferably about 15 degrees. Threading 56 may have a generally constant pitch and both a major diameter and a thread height that increases from run out 58 to an intersection with fastening portion threading 62, e.g., over a span of about 2 pitches.

Fastening Portion

Staying with FIG. 3, and moving still farther away from drilling portion 10, fastener 2 may include a fastening portion 6 having a generally cylindrical root 60. Root 60 of fastening portion 6 may be larger than outside diameter of drilling portion 10. For example, root 60 of fastening portion 6 may be between about 3/32" and about 1/4", preferably between about 1/8" and about 7/32", still more preferably, about 3/16", and in one embodiment, between about 0.178 and about 0.185".

Threading 62 on fastening portion 6 may have a coarse, heavy thread having a pitch generally equal to tapered portion threading pitch. For example, pitch may be between about 6 threads/inch and about 14 threads/inch, preferably between about 8 threads/inch and about 12 threads/inch, and in one embodiment, about 10 threads/inch. Threads 62 may have a generally constant thread height and a major diameter between about 1/8" and about 1/2", preferably between about 3/16" and about 3/8", and in one embodiment, about 1/4".

Fastening portion 6 combined with tapered portion 8 may have a length large enough to secure fastener 2 to the article to be mounted, the substrate, and the support. This combined length may vary depending on the thickness of these items, but may be between, e.g., about 3/4" and about 1 1/2", preferably between about 3/4" and about 1", still more preferably between about 7/8" and about 1". Similarly, overall length from drilling tip 18 to end of fastening portion/end of neck 66 may be between about 1" and about 1 3/4", preferably between about 1" and about 1 1/2", still more preferably about 1 1/4", and in one embodiment, about 1.275". As such, one embodiment of fastener 2 may be described as a 14-10×1.275 fastener.

Threading 56 may stop at a point spaced from underside 70 of fastener head 12, e.g., forming an unthreaded neck portion 64. As seen in the alternative embodiment of FIG. 8, neck portion 64 may have a concave root extending from underside 70 of fastener head 12 to major diameter of last pitch of thread 56, i.e., length of neck portion 64 may increase circumferentially. However, in another embodiment, thread 56 may extend substantially to underside 70 of head 12, minimizing any neck portion 64. In any event, fastener 2 may include a radius of curvature, e.g., about 0.05", between threaded portion 6 and underside of head 12.

Fastener Head

Fastener 2 may include a head 12 having a diameter substantially larger than root diameter of fastening portion 6. As seen in FIG. 5, head 12 may include torque transmitting surfaces 14 such as a screwdriver recess or, preferably, a hex head for wrench or ratchet driving. Hex head may allow torque transmitting surfaces 14 to be spaced farther from central axis 3 than would be the case for screwdriver-type driving, allowing greater torque to be applied for a given force, which may assist in driving into and through the relatively hard substrate and/or supports. Head 12 may have a maximum diameter between about 1/4" and about 1/2", preferably between about 3/8" and about 1/4", and in one embodiment, about 0.41"

In addition to hex surfaces, head 12 may include a washer 16 between hex surfaces 14 and fastening portion 6. Although drilling tip 18 may minimize furling of substrate material at front surface, larger diameter of washer 16 may both compress and cover any furling that may occur, resulting in a more secure and more visually pleasing installation. Moreover, because fiber cement substrates may be used in external applications, such as siding, washer 16 may help seal opening created by fastener 2, reducing wear and extending life of substrate. In another embodiment, fastener 2 may include a sealing component, e.g., a rubber sealing gasket, to aid in sealing opening.

Washer 16 may have a diameter between about 1/4" and about 3/4", preferably between about 3/8" and about 5/8", still more preferably about 1/2". Washer 16 also may have a thickness large enough to compress surface of substrate without buckling. Washer may be between abut 1/16" thick and about 3/16" thick, preferably between about 1/16" and about 1/8", and in one embodiment, about 0.1"

Method of Use

The method of use may include positioning the drilling tip 18 of the fastener 2 at a desired location on the face of the substrate and rotating the fastener 2 so that the drilling tip 18 drills/reams out a hole in the substrate. Substrates may vary in thickness. However, typical cement board thicknesses may be about 1/4", about 5/16", and about 0.42". If no support is located at a point underlying the substrate, the drilling tip 18 may pierce the rear side of the substrate, with drilling/reaming completed shortly thereafter, e.g., when the upper edge 39 of the trailing edge 34 reaches the rear face. At this point, the fastener 2 continues to be rotated so that the threads 56, 62 engage the wall of the reamed-out hole, tapping mating threads into the substrate. The fastener 2 may be rotated until fastener head 12 securely engages the substrate, although a gap may remain between fastener head 12 and substrate, e.g., when an object is mounted between fastener head 12 and substrate.

Steel studs vary in thickness, e.g., being offered in 12, 14, 16, 18, 20, 22 and 25 gauges. If a thin support, such as a steel support, is encountered, the drilling tip 18 may ream out a hole in the substrate until a forward face of the support is reached. At this point, the drilling tip 18 may drill into and through the support, causing the drilling tip 18 to protrude from a rear side of the support. As the fastener 2 continues to be driven, the drilling tip 18 may ream out an opening in the support having a diameter generally equal to the diameter of drilling portion 10. At around the same time, threads 56 may begin engaging the wall of the reamed-out hole, tapping mating threads into the substrate. With further rotation, threaded portion 6 may engage support. For smaller-gauged studs, support may be located between turns of threading. For larger-gauged studs, such as studs made from 12 gauge steel, support may be compressed between turns of threading, or threads may tap mating threads in support. In addition, threaded portion 6 may enlarge the opening formed in the support. The fastener 2 may be rotated until fastener head 12 securely engages the substrate, although a gap may remain between fastener head and substrate, e.g., when an object is mounted between fastener head and substrate.

Other supports may be large enough that fastener 2 will embed in stud and not protrude all the way through. For example, a 2"×4" wooden stud may be oriented so that the stud is 3 1/2" deep. If a larger support, such as a wooden stud, is encountered, the drilling tip 18 may ream out a hole in the substrate until a forward face of the support is reached. At this point, the drilling tip 18 may drill into, and start reaming out, the support. As the fastener 2 continues to be driven, positive engagement of, and tapping by, the heavy threads 56 of the threaded portion 6 with the substrate may pull the fastener 2 forward, driving the drilling tip 18 deeper into the support. With further rotation, threaded portion 6 may engage and tap mating threads in support. In addition, threaded portion 6 may enlarge the opening formed in the support. The fastener 2 may be rotated until fastener head 12 securely engages the substrate, although a gap may remain between fastener head and substrate, e.g., when an object is mounted between fastener head and substrate.

Method of Making

In one embodiment, the fastener 2 may be made from a unitary piece of material, such as the blank shown in FIG. 2. The blank may be formed by casting, but preferably is cold headed. Turning to FIG. 3, drilling tip 18 may be forged to create reaming surfaces 22 as described above. However, other methods of forming drilling tip 18 such as milling may be possible. Once drilling tip 18 is formed, fastening portion 6 may be thread rolled to form threads 56, although threads 56 may be formed by cutting.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A fastener for engaging a rigid substrate, comprising:
    a drilling portion having a reaming portion and a generally cylindrical fragment, the reaming portion having a leading face and a trailing face;
    a fastening portion having a generally constant root diameter and threading with a generally constant major diameter;
    a tapered portion between said drilling portion and said fastening portion, said tapered portion having threads with a pitch generally equal to a pitch of said fastening portion threading; and
    a head having torque transmitting surfaces;
    wherein said trailing face includes a lower edge extending from a point generally axially aligned with a central axis to an outer edge, said lower edge forming a first angle with respect to said central axis;
    wherein said drilling portion terminates in a drill tip that forms a second angle with respect to said central axis; and
    wherein said second angle is larger than said first angle.

2. A fastener according to claim 1, further comprising a pair of diametrically opposed reaming portions.

3. A fastener according to claim 1, wherein said drilling portion has a major diameter less than said fastening portion root diameter.

4. A fastener according to claim 1, wherein said head is hexagonal.

5. A fastener according to claim 1, further comprising a washer between said fastening portion and said head, said washer having a diameter larger than a diameter of said head.

6. A fastener according to claim 1, wherein said leading face and said trailing face each having an inner edge and an outer edge;
    wherein said leading face inner edge intersects and is aligned with said trailing face inner edge.

7. A fastener according to claim 6, wherein said trailing face inner edge intersects said trailing face outer edge at a point proximate an intersection of said drilling portion and said tapered portion.

8. A fastener according to claim 7, wherein said leading face outer edge has a portion that is right-handed and further wherein said trailing face outer edge has a portion that is generally parallel to an axis of said fastener.

9. A fastener according to claim 1, wherein said fastener is adapted to engage alternatively a fiber cement panel, a fiber cement panel and an underlying metal support, and a fiber cement panel and an underlying wooden stud.

10. A fastener for engaging a rigid substrate, comprising:
    a drilling portion having a plurality of reaming portions and a plurality of generally cylindrical fragments, wherein a generally cylindrical fragment is circumferentially spaced between a pair of said reaming portions,
    a fastening portion having a generally constant root diameter and threading with a generally constant major diameter;
    a tapered portion between said drilling portion and said fastening portion; and
    a head having torque transmitting surfaces;
    wherein each reaming portion has a leading face and a trailing face, said leading face having an outer edge that is right-handed; and
    wherein each trailing face on each reaming portion includes a lower edge extending from a point generally axially aligned with a central axis, each lower edge angled the same amount with respect to a central axis.

11. A fastener according to claim 10, said fastener including two reaming portions, wherein said reaming portions are generally diametrically opposed.

12. A fastener according to claim 10, wherein said drilling portion is unthreaded.

13. A fastener according to claim 10, wherein said plurality of generally cylindrical fragments have a diameter smaller than a diameter of said fastening portion.

14. A fastener according to claim 10, wherein said tapered portion has threads with a pitch generally equal to a pitch of said fastening portion threading.

15. A fastener according to claim 1, further comprising a washer between said fastening portion and said head, said washer having an underside generally perpendicular to an axis of said fastener, said washer further having a diameter larger than a diameter of said head.

16. A fastener for engaging a rigid substrate, comprising:
    a drilling portion having a plurality of reaming portions and a plurality of generally cylindrical fragments therebetween,
    a fastening portion having a generally constant root diameter and threading with a generally constant major diameter;
    a tapered portion between said drilling portion and said fastening portion; and
    a head having torque transmitting surfaces;
    wherein each reaming portion has a leading face and a trailing face, said leading face having an outer edge that is right-handed,
    wherein said leading face and said trailing face have a common inner edge, said inner edge intersecting an outer edge of said leading face and an outer edge of said trailing face proximate upper ends of said leading and trailing faces.

17. A fastener according to claim 16, wherein said torque transmitting surfaces comprise both hex surfaces and a screwdriver recess.

18. A fastener according to claim 16, wherein said common inner edge is right-handed.

19. A fastener according to claim 16, wherein said leading face and said trailing face are angled with respect to each other between about 90 degrees and about 105 degrees.

20. A fastener according to claim 16, wherein said leading face and said trailing face are angled with respect to each other about 100 degrees.

* * * * *